July 5, 1960
W. HAMILTON
2,943,760
SEALING CONNECTOR
Filed Jan. 14, 1957
3 Sheets-Sheet 1
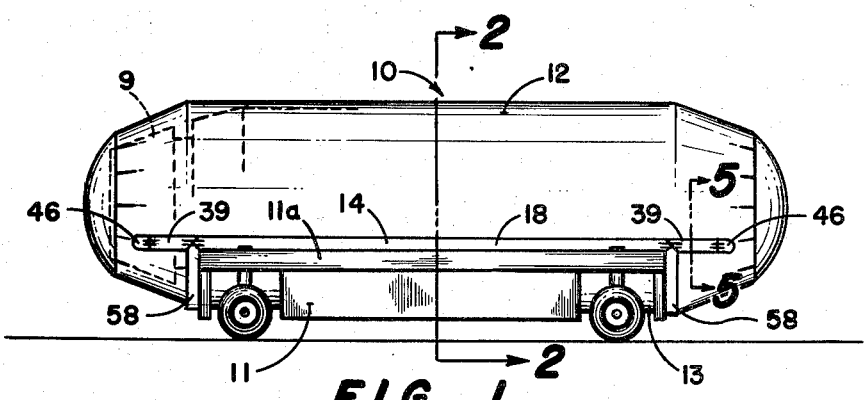
FIG. 1
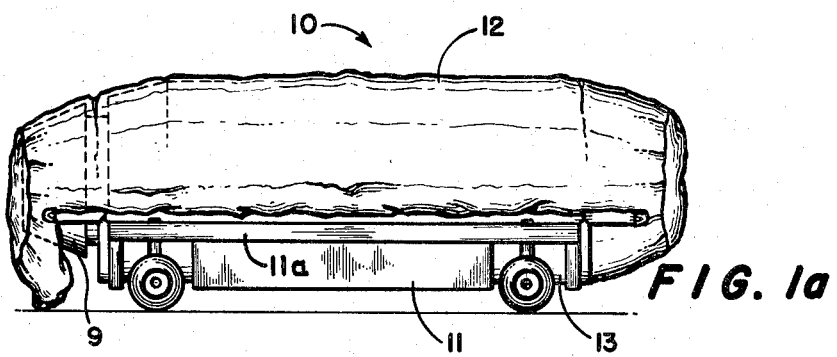
FIG. 1a
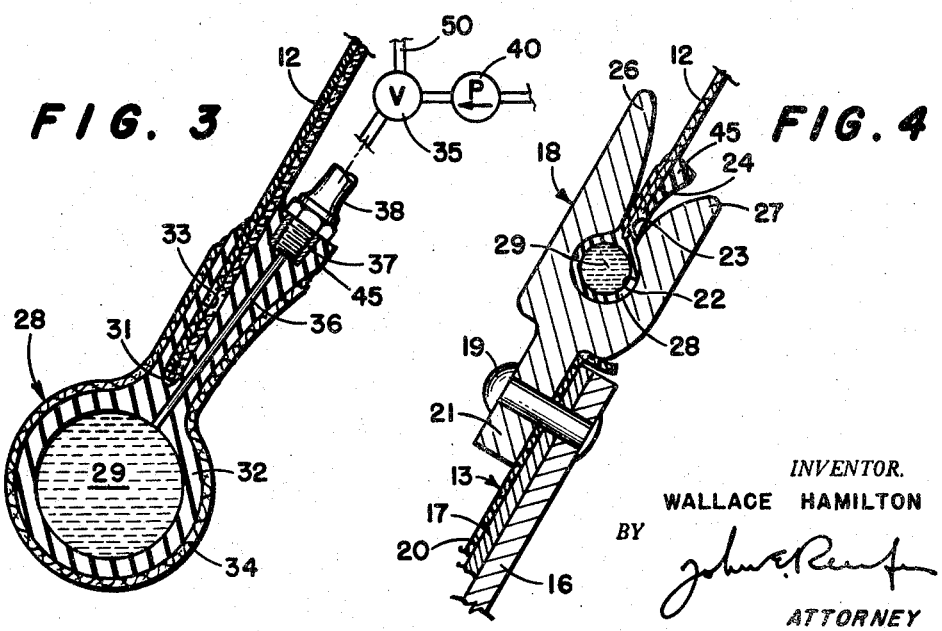
FIG. 3
FIG. 4
INVENTOR.
WALLACE HAMILTON
BY
ATTORNEY July 5, 1960

W. HAMILTON 2,943,760

SEALING CONNECTOR

Filed Jan. 14, 1957

INVENTOR.
WALLACE HAMILTON
BY
ATTORNEY

July 5, 1960
W. HAMILTON
2,943,760
SEALING CONNECTOR
Filed Jan. 14, 1957
3 Sheets-Sheet 3
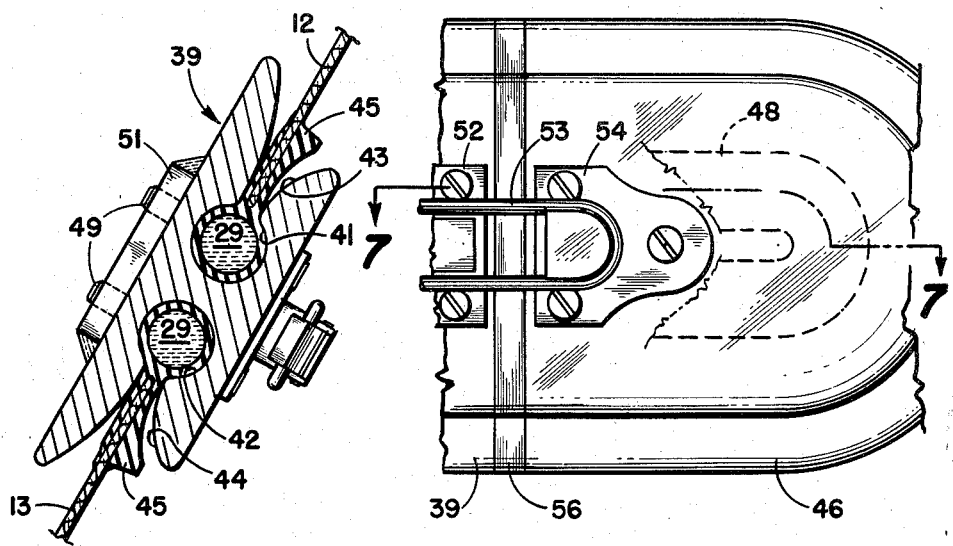
FIG. 5
FIG. 6
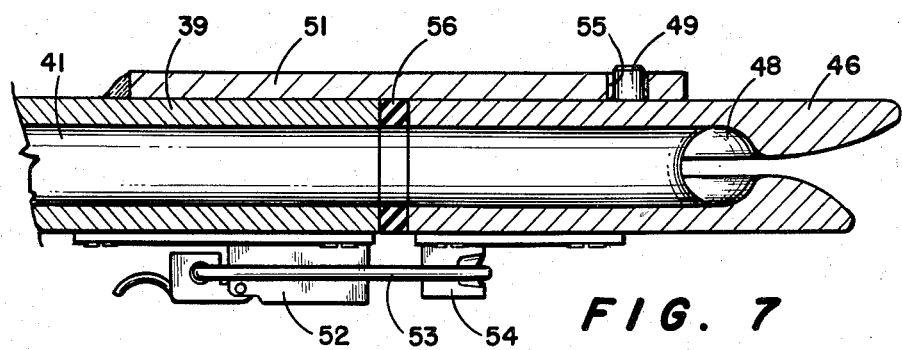
FIG. 7
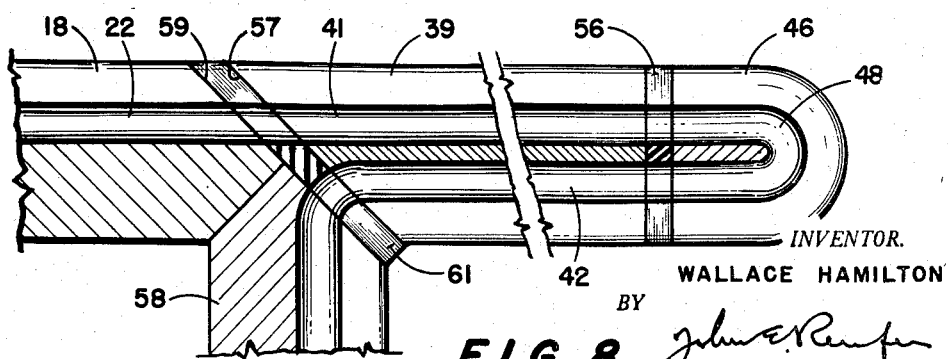
FIG. 8
INVENTOR.
WALLACE HAMILTON
BY
ATTORNEY

United States Patent Office 2,943,760
Patented July 5, 1960

2,943,760
SEALING CONNECTOR

Wallace Hamilton, Bentleyville, Ohio, assignor to Cleveland Pneumatic Industries, Inc., Cleveland, Ohio, a corporation of Ohio Filed Jan. 14, 1957, Ser. No. 634,072

1 Claim. (Cl. 220—75)

This invention relates generally to connection devices and more particularly to a detachable sealed connector suitable for use in joining seperable portions of a container wherein a positive fluid tight connection is provided.

It is an important object of this invention to provide a new and improved combination seal and connecting device which is capable of detachably connecting two parts to provide a fluid tight joint and also provide a connection which is capable of transmitting substantial forces.

It is another important object of this invention to provide a fluid tight connection suitable for use in detachably connecting two parts of a pressurized container or the like.

It is still another object of this invention to provide a fluid tight connection for use in joining two parts of a container, at least one part of which is formed of flexible material.

It is still another object of this invention to provide a fluid tight connection which utilizes incompressible liquid under low pressure to inflate and lock the connections wherein the incompressible liquid effectively provides sufficient pressure to maintain the connection against any forces tending to pull it apart.

It is still another object of this invention to provide a fluid tight connection which includes a grooved strip having a recess of a circular cross-section in which a flexible seal unit is positioned wherein the seal unit is filled with an incompressible liquid to provide a fluid tight connection capable of withstanding substantial forces.

Further objects and advantages will appear from the following description and drawings, wherein:

Figure 1 is a side elevation of a flexible container mounted on a wheeled chassis incorporating a fluid tight connection according to this invention;

Figure 1a is a view similar to Figure 1 showing how the container can be opened for access to the load;

Figure 3 is an enlarged fragmentary section showing the male portion of the seal connection according to this invention and its connection to the liquid supply system;

Figure 4 is an enlarged fragmentary section taken at A in Figure 1 showing the structure of the closed seal connection;

Figure 5 is an enlarged fragmentary section taken along 5—5 of Figure 1 showing the preferred structure of the seal connection in the zone wherein the seal extends beyond the chassis;

Figure 6 is an enlarged side elevation of a preferred structure which can be utilized where the seal must be provided with a reverse bend;

Figure 7 is a section taken along 7—7 of Figure 6; and,

Figure 8 is a fragmentary section at reduced scale with the male portion of the connector removed showing the structure of the extension which projects beyond the end of the chassis.

Figure 2:
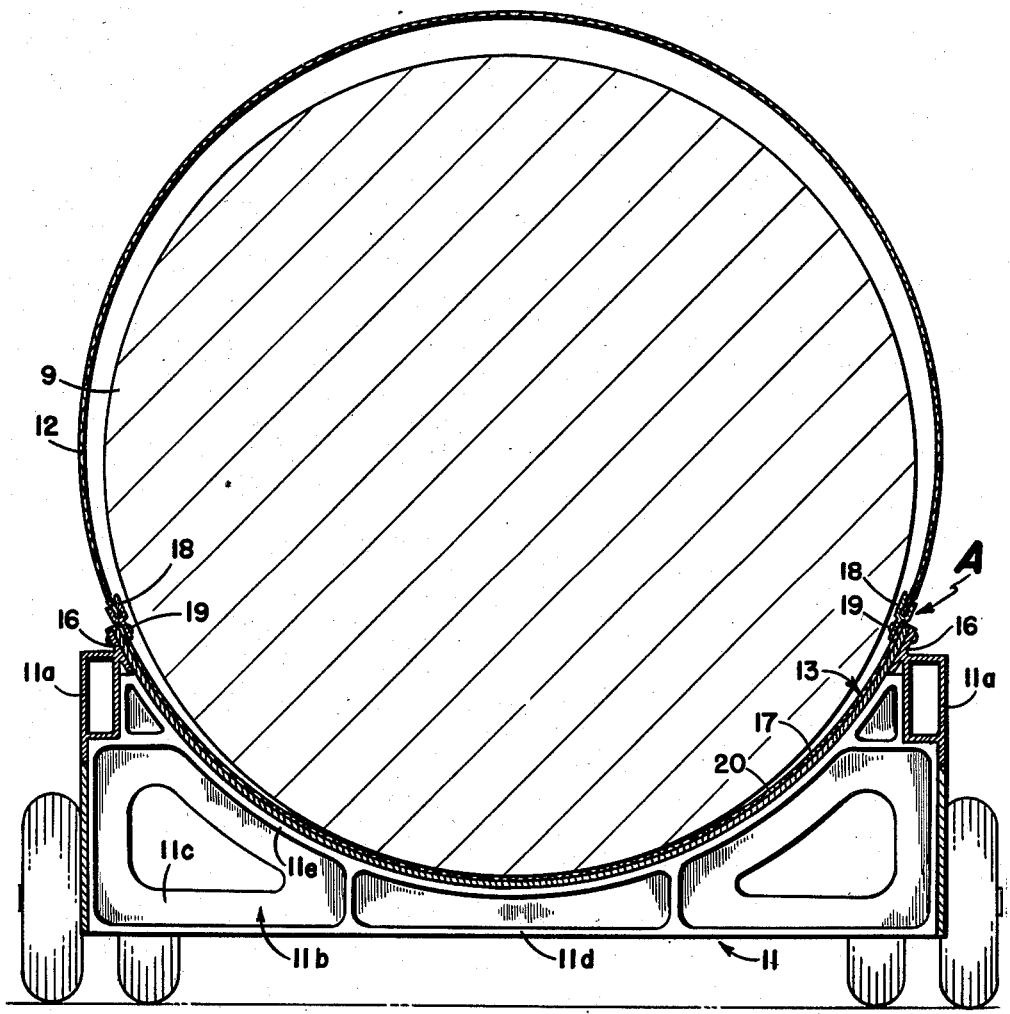
Figure 2 is a cross-section taken along 2—2 of Figure 1.

A seal connector according to this invention is particularly adapted for use with a load enclosing container of the type shown in the co-pending application Serial No. 621,950, filed November 13, 1956 in which I am a co-inventor with Jack Lovell. A container incorporating this invention is particularly adapted for use in protecting and storing a large load. The container itself is made of separable upper and lower portions which can be connected by a fluid tight connector according to this invention. At least the upper portion of the container is formed of a flexible fluid tight material such as a rubberized fabric so that it can be manually removed and easily folded or rolled up for ease of handling. When the container is closed it can be inflated with gas under pressure so that it assumes a semi-rigid form capable of adequately protecting a load. In normal practice the container is sized so that it is larger than the contained load so that a protective zone is provided between the container and load, at least around the top and sides thereof, to permit some deflection of the container without contacting the load. Referring to Figure 1, a flexible container 10, shown in an inflated condition, is formed of an upper portion 12 and a lower portion 13. Preferably this container is made of flexible material such as rubberized fabric and is of a shape corresponding to that of a load 9 it is intended to cover or protect. In the present embodiment, because the lower portion 13 is permanently attached to a chassis 11, it need not be flexible and can be made of any suitable material such as sheet metal. The upper and lower portions 12 and 13 respectively, are connected by a releasable fluid tight connection 14 when the container is closed so that the container can be pressurized or inflated to protect the contained load. Generally the container is pressurized to approximately two pounds per square inch so that it forms a relatively rigid structure capable of protecting a load. For a more detailed description of one use of such a container, reference should be made to the co-pending application cited above.

In many cases the load 9 is longer than the chassis 11 and when such is the case it is necessary to provide means to permit removal of the upper portion 12 around the ends of the load 9 as shown in Figure 1a. To permit such removal of the upper portion 12 over the ends of the load 9 I provide a removable connector extension which is used to close an extension opening described in detail below.

Referring to Figure 2 the chassis 11 is formed with two parallel longitudinal box section beams 11a connected at intervals along their length by cross beams 11b. These cross beams 11b are preferably aluminum castings or the like having a central web 11c, a lower stiffening web 11d and an upper web 11e adapted to fit along the lower side of a metal sling 17 for the support thereof. The cross beams 11b are notched at their upper ends to fit the longitudinal beams 11a and are fastened thereto by any suitable means such as welding or the like. Formed on each of the longitudinal beams 11a is a flange 16 extending the entire length of the chassis on which the lower portion 13 is mounted.

Figures 3 and 4 disclose the general structural details of the sealed connection and of the mounting of the lower portion 13 on the chassis. The lower portion 13 includes a sheet metal sling 17 extending substantially the full length of the members 16 formed with a semi-circular cross section. This sling has its inner side covered by a piece of fabric 20 which in this instance together with the sling constitutes the lower portion 13 of the container. Along each longitudinal edge of the lower portion 13, a main grooved strip 18 is mounted by rivets 19. The grooved strip 18, which would normally be formed of a light metal extrusion, is formed with a depending web 21 through which the rivets 19 project to clamp the web 21 against the upper edge of the lower portion 13 to provide a fluid tight joint therebetween. In the particular embodiment shown, the rivets 19 fasten the grooved strip 18, the fabric 20 and the sling 17 to the longitudinally extending flange 16 so that the lower portion 13 and the grooved strip 18 are permanently affixed to the chassis 11. In some cases it may be desirable to arrange the device so that the closed container 10 can be removed from the chassis 11 and in such cases the structure would be modified so that the rivets 19 would only fasten the grooved strip to the lower portion 13. If such a structure were used, the closed container could be physically removed from the chassis by any suitable lifting means.

The main strips 18 formed with a longitudinal extending recess 22 having a circular cross-section open to the upper edge of the strip through a throat 23. The throat 23 is flared away from the recess 22 to facilitate the introduction of a male portion 24 formed on the upper container portion 12 and to eliminate corners which can cause tearing of the fabric. To assist in the insertion of the male portion 14, the throat 23 is preferably formed with a lip 26 on the inside of the container extending beyond its outer lip 27 since the inner lip is hidden from view during the insertion.

In Figure 4 some of the structural details of the male portion 24 and the upper portion 12 have been eliminated for purposes of clarity so reference should be made to Figure 3 for a clear understanding of the preferred structure and its connection to the upper portion 12. The male portion 24 is formed with a liquid receiving hollow tube 28 which can be positioned within the circular recess when the connection is made and is proportioned so that it completely fills the recess when positioned therein. This male portion 24 is preferably made of rubber and is vulcanized, cemented or otherwise permanently affixed to the longitudinal edges of that portion. The upper portion 12 of the container 10 is generally formed of a double thickness of fabric folded back upon itself at its lower edge 31. Preferably the tube 28 is formed of a rubber extrusion 32 grooved at 33 to receive the lower edge of the upper portion 12 which is vulcanized or cemented to the walls of the groove 33 to provide a fluid tight joint. Wrapped around and bonded to the male portion 24 is a reinforcing rubberized fabric cover 34. This extra cover of fabric does not affect the flexibility of the tube but does tend to prevent it from being elastic. In order to introduce the liquid 29 into the hollow tube I form a male portion 24 with an enlarged side section 45 through which an inlet passage extends radially from the interior of the hollow tube along the outside of the upper portion 12. A threaded metallic insert 37 is molded into the male portion 24 around the upper end of the passage 36 so that a pressure hose 38 can be attached to admit or release the liquid 29 from a valve 35 and a pump 40.

The male portion 24 is flexible so that the tube 28 can be collapsed and inserted through the throat 23 into the recess 22 at which time the elements are in the closed or assembled relationship shown in Figure 4. The hollow tube 28 is then filled with liquid from the pump 40 and valve 35 so that is cannot be collapsed by any force tending to pull the male portion 24 out of the recess 22. In effect the liquid 29 changes the normally collapsible tube 28 into a bead or enlargement which has the characteristics of a solid confined in the recess 22.

In the illustrated embodiment the upper portion 12 projects axially beyond the end of the chassis 11 and it is necessary to provide means to permit the opening of the ends so that the upper portion can be removed over the ends of the contained load. To permit the opening of the ends, I utilize four removable strip extensions 39, best seen in Figures 5 through 8, one of which is provided at each corner of the chassis 11. Each strip extension 39 has a cross-section as shown in Figure 5 and is formed with two similar recesses 41 and 42 open through associated throats 43 and 44 respectively. A terminal piece 46 is permanently mounted at the ends of each opening 47 in the upper portion 12 and is formed with a U-shaped groove, the ends of which align with the recesses 41 and 42 on the strip extensions 39 when the terminal piece 46 is mounted on the ends of the strip extensions 39.

To provide a detachable mounting of the terminal piece 46 I provide a pin 49, shown in Figure 7, which fits into a bore 55 in a strap 51 mounted on the inside of the strip extension 39. A toggle clamp 52 mounted on the outside of the strip extension 39 is formed with a wire loop 53 which fits over a projection 54 mounted on the outside of the terminal piece 46 to complete the connection between the terminal piece 46 and the strip extension. Positioned between the terminal piece and the strip extension 39 is a formed rubber gasket 56 having a shape of the joint between the two pieces. To connect the end terminal piece 46 to the strip extension it is merely necessary to slip the strap 51 over the pin 49 and then lock the toggle lock 52. When this is done the two pieces are rigidly connected together.

The inner end of the strip extension 39 is formed with an end face 57 inclined at 45° relative to the major axis of the strip extension which is best shown in Figure 8. This end face 57 is aligned with the end of the main strip 18 and a curved end strip 58 which is permanently mounted around the ends of the lower portion 13 and in the instant case is fastened to the ends of the chassis 11 in the same manner as the main strip 18. The end strips 58 have a cross-section similar to the straight or main strip 18 but is curved to fit the end of the chassis 11. Because both the main strip 18 and the curved strip 58 are secured to the lower portion 13 and the chassis 11 they are fixed relative to each other. The ends of the main strip 18 and the curved strip 58 co-operate to provide an inclined surface 59 adjacent to the end face 57 of the strip extension 39. Here again a strap and toggle lock of the type shown in Figure 7 can be used to connect the strip extension 39 to the strips 18 and 58 mounted on the chassis 11. A formed gasket 61 is positioned along the joint to provide a fluid seal therebetween. All of the strips are arranged so that they co-operate to form a continuous recess of a circular section adapted to receive the male portion 24 completely around the opening between the upper and lower portions 12 and 13 and also provide an extension section to receive the male portion 24 along the opening 47 so complete closure is provided.

To close the container it is merely necessary to mount the strip extensions 39 on the chassis 11 by means of a detachable connection and then position the upper portion over the chassis 11. The terminal piece 46 is then connected to the strip extensions 39 and the male portion 24 positioned within the continuous recess formed in the various strips. The enlarged side section 45 extends along the entire length of the male portion 24 and provides a surface which can be gripped during the insertion of the tube 28 into the recess. During the insertion of the male portion the liquid 29 within the tube 28 is released so that the tube can be collapsed to pass through the throats. Preferably the tube should have an unstressed shape shown in Figure 3 so that once the male portion is positioned within the recess it will tend to remain in place. After the male portion is inserted in the recess all the way around the opening the liquid 29 is pressurized usually to a pressure in the order two or three pounds per square inch. This causes the tube to engage the wall of the recess and lock the connection. Once the tube is pressurized the valve 35 is closed to prevent escape of any of the liquid 29. The container 10 can then be pressurized with gas so that it is inflated to a semi-rigid shape. The gas under pressure within the container tends to pull the connection apart but since the liquid 29 is incompressible the connection will withstand any force tending to open it. This is because the liquid filled tube functions as a solid and any movement of the tube 28 out of the recess requires a reduction in volume of the tube which is prevented by the incompressible liquid 29. It should also be noted that the sealing engagement pressure between the tube 28 and the wall of the recess adjacent to the throat is a function of the forces tending to separate the connection which is in turn a function of the pressure within the container being sealed.

The tube 28 is preferably formed with a circular cross-section since such a section has the greatest volume for any given peripheral length. Therefore, since the cover 34 makes the tube 28 essentially non-elastic the tube cannot be withdrawn through the throat 23 while it is filled with liquid because such withdrawal would require the reduction of the volume of the tube which is prevented by the liquid. In effect, the liquid 29 is automatically pressurized to any pressure needed to maintain the connection by the forces tending to break the connection. This is true even though the initial liquid pressure is low. Those skilled in the art will recognize that this structure permits the use of low initial pressures and that it is not necessary to pre-charge the liquid 29 to high pressure in order to prevent the opening of the connection even though there may be large forces tending to open the connection. Because the liquid 29 is charged under relatively low pressure and since a small volume of liquid must be handled the simplest form of pump 40 can be used to provide the supply of liquid under pressure. When it is desired to open the container it is merely necessary to open the valve 35 to a reservoir return 50 to release the pressure on the liquid 29. The male portion 24 can then be pulled out through the throats which collapses the tube 28 as it is removed. As soon as the pressure of the liquid 29 is relieved such collapsing can easily take place. Those skilled in the art will recognize that the use of liquid to fill the tube 28 greatly simplifies the system since it eliminates the need of high charging pressures within the tube.

Although the preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

I claim:

A container mounted on a frame for enclosing a load carried by said frame and extending beyond the ends thereof comprising a first container portion mounted on said frame, rigid main strips mounted along the edges of said first container portion each formed with a recess extending along the length thereof and a throat open along the length of said recesses, a strip extension with one end mounted on said frame extending beyond the end of said frame formed with opposed similar recesses each of which is open through an associated throat, a terminal piece mounted on the end of said strip extension remote from said frame formed with a U-shaped recess open through a throat, said main strips co-operating with said strip extension and terminal piece to provide a connected continuous recess open throughout its length through said throats, a second container portion of flexible material formed with a continuous male portion of flexible material extending through said throats and a continuous flexible non-elastic tube positioned in said recess, liquid filling said tube so that it completely fills said recess and provides a fluid tight engagement with the wall thereof whereby said container portions are connected together and co-operate to form a fluid tight container.

References Cited in the file of this patent

UNITED STATES PATENTS

| | | |
|---|---|---|
| 1,669,183 | Wilson | May 8, 1928 |
| 2,460,853 | Siple | Feb. 8, 1949 |
| 2,644,553 | Cushman | July 7, 1953 |
| 2,690,854 | Kaye | Oct. 5, 1954 |
| 2,726,056 | Tatom et al. | Dec. 6, 1955 |

FOREIGN PATENTS

| | | |
|---|---|---|
| 939,611 | Germany | Feb. 23, 1956 |